United States Patent
Sheth et al.

(10) Patent No.: US 7,529,832 B2
(45) Date of Patent: May 5, 2009

(54) PPP DOMAIN NAME AND L2TP TUNNEL SELECTION CONFIGURATION OVERRIDE

(75) Inventors: Purnam Anil Sheth, Livermore, CA (US); Aravind Sitaraman, Bangalore (IN); Charles T. Yager, Cupertino, CA (US); Gregory D. Burns, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 899 days.

(21) Appl. No.: 10/973,550

(22) Filed: Oct. 25, 2004

(65) Prior Publication Data

US 2005/0086495 A1 Apr. 21, 2005

(51) Int. Cl.
*G06F 15/173* (2006.01)
*G06F 15/16* (2006.01)

(52) U.S. Cl. .................... 709/225; 709/229; 726/2; 370/397

(58) Field of Classification Search ......... 709/227–229, 709/225, 217–219; 726/2–4; 370/397, 399, 370/409
See application file for complete search history.

(56) References Cited

U.S. PATENT DOCUMENTS

| | | | |
|---|---|---|---|
| 4,644,532 A | 2/1987 | George et al. | |
| 4,669,113 A | 5/1987 | Ash et al. | |
| 4,896,319 A | 1/1990 | Lidinsky et al. | |
| 4,995,074 A | 2/1991 | Goldman et al. | |
| 5,014,265 A | 5/1991 | Hahne et al. | |
| 5,115,427 A | 5/1992 | Johnson, Jr. et al. | |
| 5,159,592 A | 10/1992 | Perkins | |
| 5,239,537 A | 8/1993 | Sakauchi | |
| 5,265,245 A | 11/1993 | Nordstrom et al. | |
| 5,274,634 A | 12/1993 | Babiarz | |
| 5,274,643 A | 12/1993 | Fisk | |
| 5,280,470 A | 1/1994 | Buhrke et al. | |
| 5,305,311 A | 4/1994 | Lyles | |

(Continued)

FOREIGN PATENT DOCUMENTS

WO 99/23852 5/1999

OTHER PUBLICATIONS

David Allen, "Semi Permanent PPP Connections (sP$^4$)", Nortel Networks, pp. 1-7, Feb. 8-11, 2000.

(Continued)

*Primary Examiner*—Kevin Bates
*Assistant Examiner*—David Lazaro
(74) *Attorney, Agent, or Firm*—Patent Capital Group

(57) ABSTRACT

Determining the domain name associated with a virtual circuit may includes receiving, at an Authentication, Authorization, and Accounting (AAA) server, a Point-to-Point Protocol (PPP) authentication request comprising a unique identifier comprising a virtual channel ID, and determining whether a domain configuration override attribute exists in a virtual circuit profile associated with a DSLAM port used to receive the PPP authentication request. Determining the domain name further includes, if the domain configuration override attribute exists in the virtual circuit profile or if the PPP authentication request does not comprise a domain name, returning a domain name associated with the unique identifier, and if the domain configuration override attribute does not exist in the virtual circuit profile, returning a PPP domain name used in the PPP authentication request.

8 Claims, 5 Drawing Sheets

| VPI/VCI | Domain Configuration Override | Domain Name |
|---|---|---|
| 10/2 | Yes | corpA.com |
| 33/1 | Yes | corpB.com |
| 94/22 | Yes | CorpC.com |

U.S. PATENT DOCUMENTS

| | | |
|---|---|---|
| 5,347,511 A | 9/1994 | Gun |
| 5,371,852 A | 12/1994 | Attanasio et al. |
| 5,406,643 A | 4/1995 | Burke et al. |
| 5,408,469 A | 4/1995 | Opher et al. |
| 5,416,842 A | 5/1995 | Aziz |
| 5,422,882 A | 6/1995 | Hiller et al. |
| 5,426,636 A | 6/1995 | Hiller et al. |
| 5,428,607 A | 6/1995 | Hiller et al. |
| 5,430,715 A | 7/1995 | Corbalis et al. |
| 5,437,013 A | 7/1995 | Rubin et al. |
| 5,452,297 A | 9/1995 | Hiller et al. |
| 5,461,624 A | 10/1995 | Mazzola |
| 5,469,556 A | 11/1995 | Clifton |
| 5,510,777 A | 4/1996 | Pilc et al. |
| 5,539,884 A | 7/1996 | Robrock, II |
| 5,555,244 A | 9/1996 | Gupta et al. |
| 5,570,361 A | 10/1996 | Norizuki et al. |
| 5,578,955 A | 11/1996 | Matsue et al. |
| 5,583,862 A | 12/1996 | Callon |
| 5,588,003 A | 12/1996 | Ohba et al. |
| 5,602,918 A | 2/1997 | Chen et al. |
| 5,604,803 A | 2/1997 | Aziz |
| 5,617,417 A | 4/1997 | Sathe et al. |
| 5,621,721 A | 4/1997 | Vatuone |
| 5,623,605 A | 4/1997 | Keshav et al. |
| 5,631,897 A | 5/1997 | Pacheco et al. |
| 5,642,515 A | 6/1997 | Jones et al. |
| 5,649,108 A | 7/1997 | Spiegel et al. |
| 5,655,077 A | 8/1997 | Jones et al. |
| 5,671,354 A | 9/1997 | Ito et al. |
| 5,673,265 A | 9/1997 | Gupta et al. |
| 5,684,950 A | 11/1997 | Dare et al. |
| 5,689,566 A | 11/1997 | Nguyen |
| 5,708,812 A | 1/1998 | Van Dyke et al. |
| 5,715,399 A | 2/1998 | Bezos |
| 5,717,690 A | 2/1998 | Peirce, Jr. et al. |
| 5,734,654 A | 3/1998 | Shirai et al. |
| 5,740,171 A | 4/1998 | Mazzola et al. |
| 5,740,176 A | 4/1998 | Gupta et al. |
| 5,740,371 A | 4/1998 | Wallis |
| 5,742,604 A | 4/1998 | Edsall et al. |
| 5,745,708 A | 4/1998 | Weppler et al. |
| 5,764,636 A | 6/1998 | Edsall |
| 5,768,519 A | 6/1998 | Swift et al. |
| 5,796,732 A | 8/1998 | Mazzola et al. |
| 5,802,290 A | 9/1998 | Casselman |
| 5,815,665 A | 9/1998 | Teper et al. |
| 5,852,607 A | 12/1998 | Chin |
| 5,864,542 A | 1/1999 | Gupta et al. |
| 5,918,019 A | 6/1999 | Valencia |
| 5,944,824 A | 8/1999 | He |
| 5,949,755 A | 9/1999 | Uphadya et al. |
| 5,991,828 A | 11/1999 | Horie et al. |
| 5,999,514 A | 12/1999 | Kato |
| 5,999,518 A | 12/1999 | Nattkemper et al. |
| 6,009,103 A | 12/1999 | Woundy |
| 6,011,910 A | 1/2000 | Chau et al. |
| 6,021,496 A | 2/2000 | Dutcher et al. |
| 6,023,474 A | 2/2000 | Gardner et al. |
| 6,026,441 A | 2/2000 | Ronen |
| 6,044,402 A | 3/2000 | Jacobson et al. |
| 6,047,376 A | 4/2000 | Hosoe |
| 6,061,650 A | 5/2000 | Malkin et al. |
| 6,069,895 A | 5/2000 | Ayandeh |
| 6,078,957 A | 6/2000 | Adelman et al. |
| 6,081,508 A | 6/2000 | West et al. |
| 6,081,518 A | 6/2000 | Bowman-Amuah |
| 6,084,892 A | 7/2000 | Benash et al. |
| 6,091,951 A | 7/2000 | Sturniolo et al. |
| 6,092,178 A | 7/2000 | Jindal et al. |
| 6,092,196 A | 7/2000 | Reiche |
| 6,094,437 A | 7/2000 | Loehndorf, Jr. et al. |
| 6,108,708 A | 8/2000 | Iwata |
| 6,115,468 A | 9/2000 | De Nicolo |
| 6,118,785 A | 9/2000 | Araujo et al. |
| 6,119,160 A | 9/2000 | Zhang et al. |
| 6,134,666 A | 10/2000 | De Nicolo |
| 6,154,775 A | 11/2000 | Coss et al. |
| 6,212,561 B1 | 4/2001 | Sitaraman et al. |
| 6,219,790 B1 * | 4/2001 | Lloyd et al. .................. 726/14 |
| 6,236,655 B1 | 5/2001 | Caldara et al. |
| 6,252,878 B1 | 6/2001 | Locklear, Jr. et al. |
| 6,298,043 B1 | 10/2001 | Mauger et al. |
| 6,301,229 B1 | 10/2001 | Araujo et al. |
| 6,308,213 B1 | 10/2001 | Valencia |
| 6,396,838 B1 | 5/2002 | Palnati |
| 6,400,716 B1 | 6/2002 | Munakata et al. |
| 6,408,336 B1 | 6/2002 | Schneider et al. |
| 6,412,003 B1 | 6/2002 | Melen |
| 6,415,313 B1 | 7/2002 | Yamada et al. |
| 6,430,152 B1 | 8/2002 | Jones et al. |
| 6,434,156 B1 | 8/2002 | Yeh |
| 6,438,612 B1 | 8/2002 | Ylonen et al. |
| 6,446,200 B1 | 9/2002 | Ball et al. |
| 6,456,623 B1 | 9/2002 | Kobayasi et al. |
| 6,463,475 B1 | 10/2002 | Calhoun |
| 6,466,976 B1 | 10/2002 | Alles et al. |
| 6,498,845 B1 | 12/2002 | Martz et al. |
| 6,507,577 B1 | 1/2003 | Mauger et al. |
| 6,519,254 B1 | 2/2003 | Chuah et al. |
| 6,522,627 B1 | 2/2003 | Mauger |
| 6,526,033 B1 | 2/2003 | Wang et al. |
| 6,542,919 B1 | 4/2003 | Wendorf et al. |
| 6,597,689 B1 | 7/2003 | Chiu et al. |
| 6,609,153 B1 | 8/2003 | Salkewicz |
| 6,614,809 B1 | 9/2003 | Verma et al. |
| 6,615,358 B1 | 9/2003 | Dowd et al. |
| 6,651,096 B1 | 11/2003 | Gai et al. |
| 6,654,792 B1 | 11/2003 | Verma et al. |
| 6,665,273 B1 | 12/2003 | Goguen et al. |
| 6,665,305 B1 | 12/2003 | Weismann |
| 6,717,944 B1 | 4/2004 | Bryden et al. |
| 6,741,599 B1 | 5/2004 | Dunn et al. |
| 6,785,228 B1 | 8/2004 | Vandette et al. |
| 2002/0016501 A1 | 2/2002 | Okoshi et al. |

OTHER PUBLICATIONS

Ascend Communications, "MultiVPN from Ascend Communications: Breaking Down the Barriers to VPNs", White Paper, 1998.

Carrel, "The TACACS+ Protocol", Network Working Group, Jan. 1998, pp. 1-40.

Cisco Systems White Paper, "Cisco Asymmetric Digital Subscriber Line Services Architecture", printed from http://www.cisco.com/warp/public/cc/so/neso/dsso/global/adsl_wp.htm on Sep. 27, 2000.

Cisco Systems, "Cisco 6400 Universal Access Concentrator", Product Bulletin- No. 1120, printed from http://www/cisco.com/warp/public/cc/pd/as/6400//prodlit/1120_pp.htm on Oct. 4, 2000.

Cisco Systems, "Cisco 6400 *Series* Universal Access Concentrator", printed from http://www.cisco.com/warp/public/cc/pd/as/6400/prodlit/6400_ds.htm on Sep. 27, 2000.

Cisco Systems, "Layer 2 Tunnel Protocol", Release 12.0(1)T and 11.3(5)AAA, pp. 1-53.

Fogarty et al., "Microsoft Tunnels Through the 'Net with New Protocol", WANs & Internetworking, Network World, pp. 17 and 20, Mar. 28, 1996.

Mecklermedia Corporation, "L2TP", printed from http://webopedia.internet.com/TERM/L/L2TP.html on Sep. 21, 1998.

Mecklermedia Corporation, "Tunneling", printed from http://webopedia.internet.com/TERM/t/tunneling.html, 1998.

Mathieson et al., "High Speed Communications for Control Systems", IEEE, pp. 1826-1828, 1993.

Rigney et al., Remote Authentication Dial in User Service (Radius), Network Working Group, pp. 1-57, Apr. 1997.

David R. Safford et al., "Secure RPC Authentication (SRA) for TELNET and FTP", USENIX Association, 1993.

Christoph L. Schuba et al., "Countering Abuse of Name-Based Authentication", Coast Laboratory, Department of Computer Sciences, Purdue University, date unknown, 21 pages.

Valencia et al, "Layer Two Tunneling Protocol L2TP", PPP Working Group, pp. 1-93, May 1998.

Xu et al., "Design and Evaluation of a High-Performance ATM Firewall Switch and its Applications", IEEE Journal of Selected Areas in Communications, vol. 17, No. 6, pp. 1190-1200, Jun. 1999.

* cited by examiner

PPP DOMAIN NAME AND L2TP TUNNEL SELECTION CONFIGURATION OVERRIDE

CROSS REFERENCE TO RELATED APPLICATIONS

This application claims priority based on parent application Ser. No. 09/712,780, entitled "PPP Domain Name and L2TP Tunnel Selection Configuration Override" by Purnam Anil Sheth, Aravind Sitaraman, Charles T. Yager and Gregory D. Burns, filed on Nov. 13, 2000.

CROSS REFERENCE TO RELATED APPLICATIONS

This application is related to the following:
U.S. patent application Ser. No. 09/488,394, filed Jan. 20, 2000 in the name of inventors Aravind Sitaramin, Aziz Abdul, Bernard Janes, Dennis Cox, John Joyce, Peter Heitman, Shujin Zhang and Rene Tio, entitled "System and Method for Identifying a Subscriber for Connection to a Communication Network", commonly assigned herewith.
U.S. patent application Ser. No. 09/488,395, filed Jan. 20, 2000 in the name of inventors Aravind Sitaramin, Dennis Cox, John Joyce and Shujin Zhang, entitled "System and Method for Determining Subscriber Information", commonly assigned herewith.
U.S. patent application Ser. No. 09/712,005, filed Nov. 13, 2000 now U.S. Pat. No. 6,874,030 in the name of inventors Purnam Sheth, Aravind Sitaraman, Charles Yager and Gregory Burns, entitled "PPP/L2TP Domain Name Pre-Authorization", commonly assigned herewith.

BACKGROUND OF THE INVENTION

1. Field of the Invention

The present invention relates to the field of data communications. More particularly, the present invention relates to a system and method for static selection of tunnel-based network connections.

2. The Background Art

A significant concern of the individual private and public domains making up the Internet or any other system incorporating multiple networks is the ability to ensure that only those subscribers who are authorized to access the individual private and public domains within the comprehensive network have the capability to access such networks. Serious security risks are posed by the possibility of unauthorized users having the know-how and capability to invade the individual private and public domains within the network.

In today's networking environment, many privately owned domain sites exist on the Internet that allow access only to those individuals which have been granted the proper authorization. For example, these may include company owned private domains containing confidential information and, as such, the company may grant access only to those employed by the company, or they may be communities of interest (i.e. "pay-sites") that provide information only to those subscribers which subscribe to the privately owned domain. The subscriber who connects to the Internet, typically by means of an Internet Service Provider (ISP) or Telephone Company (Telco), may also possess the capability to assume the identity of an authorized user. This capability heightens the potential for security violations.

Additionally, it is becoming increasingly more prevalent for individual computer users to have the capability to remotely access privately owned intra networks. Such Virtual Private Networks (VPNs) allow the user to connect with the private intra network of the company from the user's residence by means of the telephone line or other convenient means. The inception of wireless remote connections have even made it possible for users to connect from almost any imaginable locale. The ability to connect remotely to individual private intra networks, once seen as a luxury, has become so commonplace that many working professionals require such access in order to accomplish their everyday job assignments. In many instances, remote users connect to privately owned intra networks through the same means that individuals connect to the Internet, typically Telcos or ISPs. VPNs are cost-effective because users can connect to the Internet locally and tunnel back to connect to corporate resources. This reduces overhead costs associated with traditional remote access methods.

FIG. 1 shows a simplified diagram of a computer user connected to a computer network 10 via a host computer 12 linked to an access point 14 which grants authorization to external networks or domains 16, 18 and 20. The potential for a network security violation is posed by the user having the capability through the access point 14 to reach or "Knock on the door" of home gateways 22, 24 and 26.

Still referring to FIG. 1, the user has access to the computer networks through a workstation or host computer 12. The host computer 12 has the capability to connect with the external networks through an access point 14. An access point 14 is essentially an external location capable of permitting authorized users to access external computer networks. Typically, the access point consists of a series of Network Access Servers (NASs) and other related hardware, software and/or firmware. An access point 14 may also include a modem pool (not shown) maintained by a Telephone Company (Telco) or an Internet Service Provider (ISP) which enables its authorized users or subscribers to obtain external network access through the host computer 12 which has the required dial-up connection capability. Those of ordinary skill in the art will recognize that other types of access methods may be provided by a Telcos or ISP such as frame relay, leased lines, ATM (Asynchronous Transfer Mode), ADSL (Asymmetric Digital Subscriber Line) and the like.

Typically, when the user desires to access a specified domain, such as the first privately owned secured domain site 16, the user runs a network logon application program on the host computer 12 which requires the user to input user identification and authorization information as a means of initiating access to the desired network. This information is then directed to the access point 14 where it is verified to ensure that the host user has the required authorization to permit access to the desired network. Once authorization is granted to the user, a connection is established via the access point 14 with the home gateway 22 of the specified first privately owned secure domain site 16. The connection established may be a tunnel-based connection, such as L2TP (Layer Two Tunneling Protocol) or L2F (Layer Two Forwarding), or an IP-based (Internet Protocol) connection, such as used with ATM or frame relay. The user of the host computer 12, having established such a connection, has the ongoing capability to access the specified domain until the connection is terminated either at the directive of the user or by error in data transmission. The access point 14 will typically have the capability to connect the user to various other privately owned secured domain sites, such as the second private domain site 18 or the public Internet 20. The user of the host computer 12 may use the PPP protocol to connect through the wholesaler networks to another Home Gateway.

Layer 2 Tunneling Protocol (L2TP) is used in many Virtual Private Networks (VPNs). An L2TP access concentrator (LAC) is a device that the client directly connects to and that tunnels Point-to-Point (PPP) frames to the L2TP network server (LNS). The LAC is the initiator of incoming calls and the receiver of outgoing calls. An L2TP network server (LNS) is the Termination point for an L2TP tunnel and the access point where PPP frames are processed and passed to higher layer protocols. The LNS handles the server side of the L2TP protocol. The LNS terminates calls arriving at any of the LAC's PPP interfaces, including asynchronous, synchronous and ISDN. The LNS is the initiator of outgoing calls and the receiver of incoming calls.

FIG. 2 is a block diagram that illustrates an L2TP tunnel and how a user typically connects to a privately owned domain site such as a corporate intranet. Using L2TP tunneling, an L2TP access concentrator (LAC) 100 located at the ISP's point of presence (POP) 105 exchanges PPP messages 110 with remote users 115 and communicates by way of L2TP requests and responses with the customer's L2TP network server (LNS) 120 to set up tunnels 125. The L2TP protocol passes protocol-level packets through the virtual tunnel 125 between end points of a point-to-point connection. Frames from remote users are accepted by the ISP's POP 105, stripped of any linked framing or transparency bytes, encapsulated in L2TP and forwarded over the appropriate tunnel 125. The customer's home gateway 120 accepts these L2TP frames, strips the L2TP encapsulation, and processes the incoming frames for the appropriate interface.

Turning now to FIG. 3 a block diagram that illustrates the use of AAA servers in an L2TP tunneling network is presented. The selection of the L2TP tunnel 200 at the LAC 205 or NAS is typically determined by an authentication, authorization and accounting (AAA) server 210 based upon the structured username (username@domain) in the PPP authentication packet. The AAA 210 looks up a service profile that matches the domain name string. The service profile includes the IP address of the L2TP network server (LNS) 215 and a password for the tunnel 200. Once tunnels are established, the LAC 205 forwards the subscriber's PPP session to the destination LNS 215 through the L2TP tunnel 200. The ISP or enterprise customer 220 receives new PPP sessions and authenticates the sessions using AAA server 225. Authenticated sessions are established on the LNS 215, while sessions that fail authentication are rejected.

Present methods of establishing a tunnel allow an unauthorized user to reach or "Knock on the door" of another Home Gateway 215, merely by changing the domain name provided in the PPP authentication packet to the domain name of the intended Home Gateway 215. In this scenario, all users having access to access point 205 would have the potential to reach the privately owned secured domain site. For example, a user having a domain name of xxx@corpA.com may change the domain name in the PPP authentication packet to xxx@corpB.com, allowing the user's PPP session to be forwarded to the corpB LNS through the L2TP tunnel assigned to corpB. Allowing such unauthorized access to a Home Gateway 215 subjects the Home Gateway 215 to potential security risks, including denial of service attacks.

Denial-of-service attacks typically focus on making a service unavailable for normal use, which is often accomplished by exhausting a resource limitation on the network or within an operating system or application. When involving specific network server applications, these attacks can focus on acquiring and keeping open all of the available connections supported by that server, effectively locking out valid users of the server or service. For example, a user intending to exploit present day L2TP systems could flood the network with many PPP sessions targeted to a Home Gateway for which the user is not authorized. Although the LNS authentication process would typically prevent an unauthorized user from access to the corporate intranet, the resources devoted to handling the large number of PPP sessions could adversely affect the services available to authorized users.

The currently available solutions to this problem are very limited and do not offer the level of security protection that most companies operating secured and confidential private intra networks demand. Companies have been able to minimize the risk by setting up internal access points which effectively cause the user/host to dial-in or connect directly with the private intra network without going through an external ISP or Telco. While this direct-connect service allows some measure of security it does so at the expense of increasing the costs associated with maintaining an internal access point and the additional connection costs related to remote users having to potentially incur long distance telephone service charges.

What is needed is a solution that prevents unauthorized PPP sessions from being forwarded to a destination LNS. A further need exists for such a solution that does not alter the original PPP authentication packet.

BRIEF DESCRIPTION OF THE INVENTION

A method for controlling subscriber access in a network capable of establishing connections with multiple services includes receiving a communication from a subscriber using a first communication network coupled to a second communication network, the communication optionally including a domain identifier associated with a service on the second communication network, and authorizing the subscriber to access a service on the second communication network using a virtual circuit. The authorization is based upon a domain configuration override attribute associated with the virtual circuit used to receive the communication from the subscriber. An access server capable of forcing subscribers of a communications system to gain access exclusively to a domain network associated with a virtual circuit includes an authorizer to grant service authorization to the subscribers based upon a virtual circuit used to make a service request, a virtual circuit profile request generator to generate virtual circuit profile requests and a calculator to determine whether the service associated with the virtual circuit matches the service associated with a domain configuration override attribute.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

In accordance with a presently preferred embodiment of the present invention, the components, processes and/or data structures may be implemented using C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with one embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and still be within the inventive concepts disclosed herein.

Figure 1:
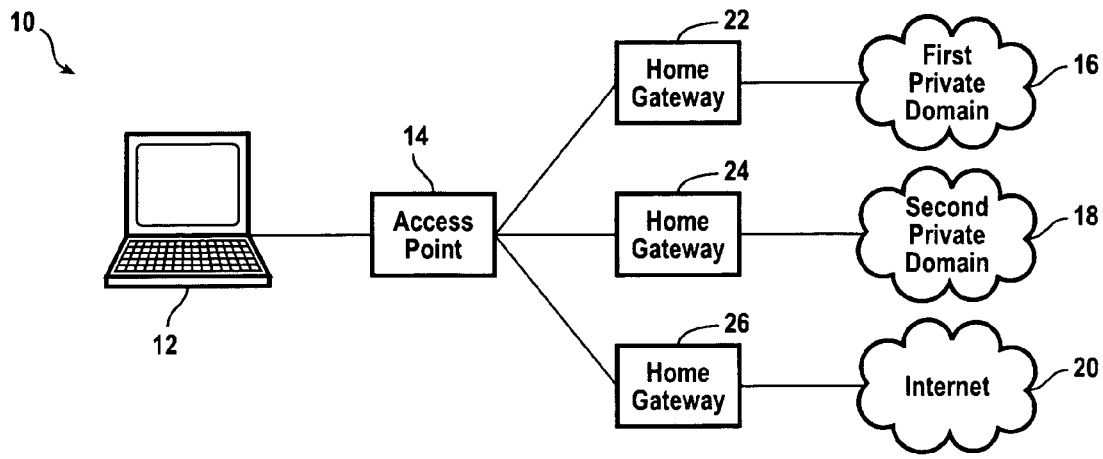
FIG. 1 is a block diagram of a computer network wherein the host computer has access to multiple domains within the network.
Figure 2:
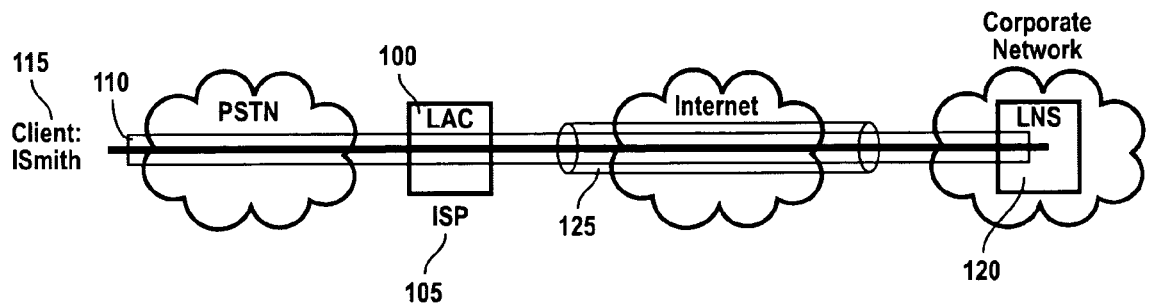
FIG. 2 is a block diagram that illustrates an L2TP tunnel and how a user typically connects to a corporate intranet.
Figure 3:
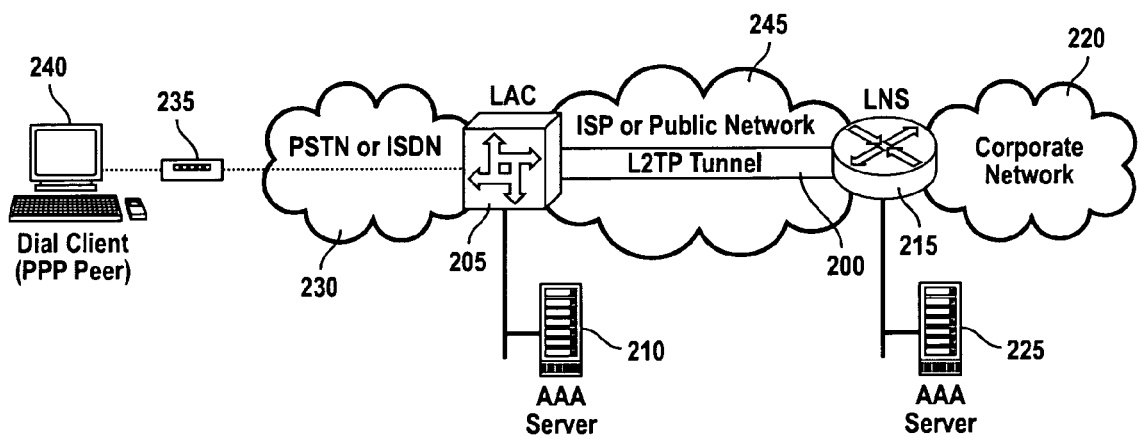
FIG. 3 is a block diagram that illustrates the use of AAA servers in an L2TP tunneling network.
Figure 4:
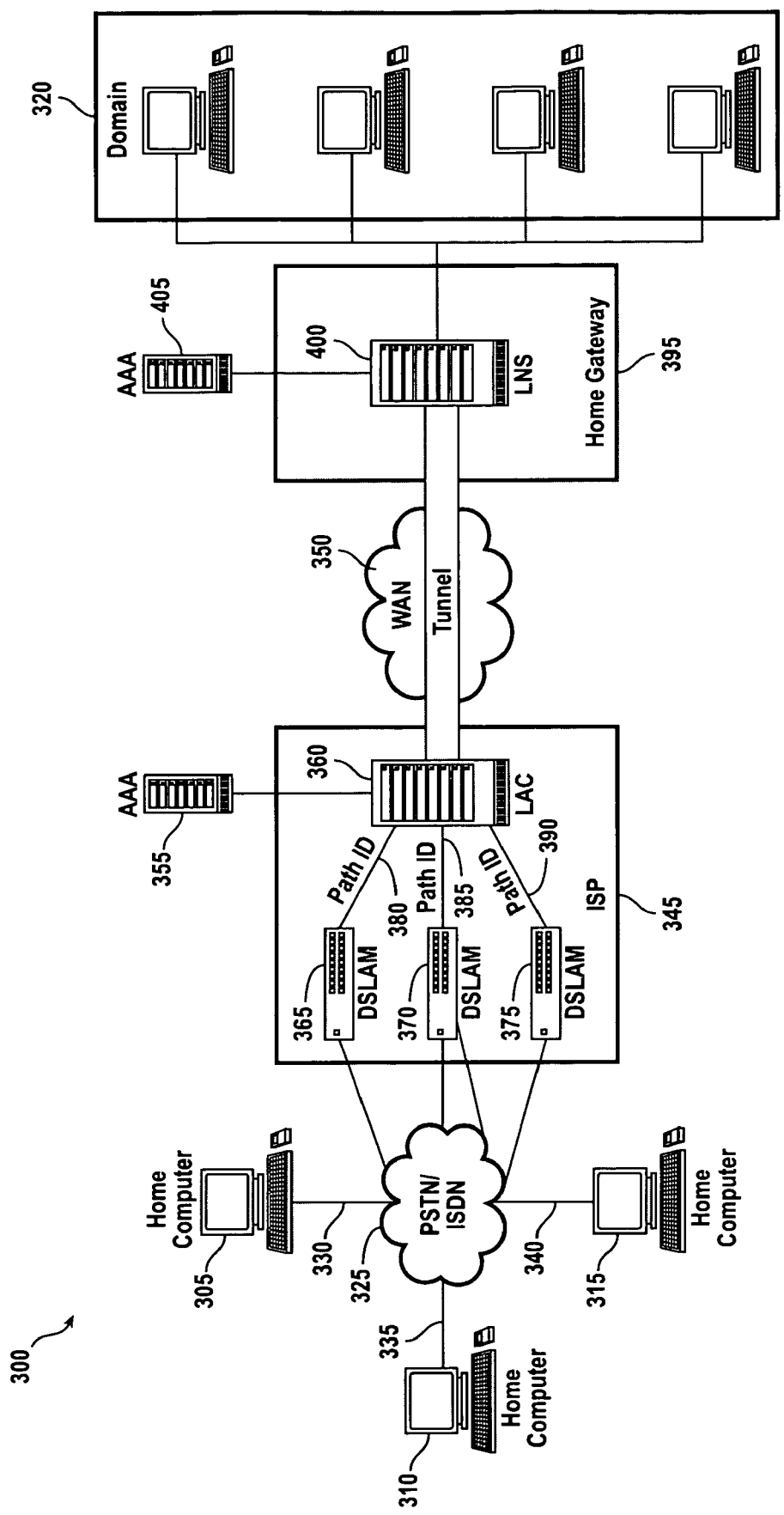
FIG. 4 is a block diagram of a differentiated computer network that has the capability to force subscribers of the system to gain access exclusively to a domain network associated with a virtual circuit in accordance with one embodiment of the present invention.

Turning now to FIG. 4, a block diagram that illustrates a communication system 300 in accordance with one embodiment of the present invention is presented. Users connect to public or private domain networks within communication system 300 through host computers 305, 310, 315. The host computers 305, 310, 315 have the capability to connect or link with domain 320. Domain 320 may be a private domain or a public domain, such as the Internet or a private intra network. These links or connections are established via a series of hardware that serve to grant access to specific domains and transport data packets to and from the host computers 305, 310, 315 and domain 320.

The host computers 305, 310, 315 in this particular computer network are connected to a Publicly Switched Telephone Network (PSTN) 325 via a transmission means 330, 335, 340, such as copper wire or cable. Broadcast mechanisms such as ADSL (Asymmetric Digital Subscriber Line) may be used. Those of ordinary skill in the art will recognize that other types of broadcast mechanisms may be provided by an ISP or Telco such as Ethernet™, frame relay, leased lines, ATM (Asynchronous Transfer Mode) or the like. Access points 345 are located within a wide area network (WAN) 350 and are operated by Telcos or ISPs. The access points 345 house AAA servers 355, Service Selection Gateways (not shown in FIG. 4), L2TP Access Concentrators (LACs) 360, Digital Subscriber Line Aggregation Multiplexers (DSLAMs) 365, 370, 375 or similar devices. The Service Selection Gateway (SSG) is not an integral part of the present invention and therefore a discussion related to their functionality would not benefit the discussion of the present invention. The SSG serves as a gateway between the user and public area domains, such as the Internet.

In order for a user host to gain access to a public domain network, such as the Internet, users must first dial-in or otherwise make a connection with the SSG through a data-receiving interface (not shown in FIG. 4). As a threshold matter, an authorizer (not shown in FIG. 4) within the LAC serves to authenticate the identity of the user, ensure authorization and ascertain the nature and scope of the public network services that it will provide.

According to one embodiment of the present invention, an access point 345 includes one or more DSLAMs 365, 370, 375 that service the copper loops between the access point 345 and the Customer Premises Equipment (CPE) 305, 310, 315. DSLAMs 365, 370, 375 may link locally or via an inter-central office (CO) link to LAC 360. Traffic enters and exits the DSLAM chassis through ports, each of which is assigned a port address. A virtual circuit or channel (VC) is a logical circuit created to ensure reliable communication between two network devices. A VC is defined by a Virtual Path Identifier (VPI)/Virtual Channel Identifier (VCI) pair, which is directly tied to a particular DSLAM port used by a particular subscriber.

The LAC 360 is linked to a separate server/memory device 355, herein referred to as an Authentication, Authorization and Accounting (AAA) server 355. The LAC 360 and the AAA server 355 communicate with one-another according to the Remote Authentication Dial-In User Service (RADIUS) protocol. The specific details of the RADIUS protocol are well known by those of ordinary skill in the art. Moreover, as will be apparent to those of ordinary skill in the art, the RADIUS protocol has limited applicability to the present invention and, therefore a detailed discussion of this protocol is deemed unnecessary. The preferred methods of the present invention described herein are not limited to the use of the RADIUS protocol and other equivalent authentication protocols may be used.

When the LAC 360 receives a PPP authentication request, a virtual circuit profile request generator (not shown in FIG. 4) generates a request packet and a forwarding interface (not shown in FIG. 4) sends a request packet to the AAA server 350. The packet includes the virtual circuit ID 380, 385, 390 associated with the virtual channel used to receive the PPP session. The AAA server 355 receives a request packet from the LAC 360, consults the data bank of virtual circuit profiles contained in its memory and makes a match based on the virtual circuit ID 380, 385, 390 provided in the request. In order to access the individual profile, a match must be made between the virtual circuit ID 380, 385, 390 in the request packet and the individual profile. If the virtual circuit ID 380, 385, 390 match, and all other requirements are met, the AAA server 350 sends the LAC 360 a virtual circuit profile packet. The virtual circuit profile packet contains all the pertinent information in the port specific virtual circuit profile that enables the LAC 360 to provide the desired service to the user.

The virtual circuit profile packet travels from the AAA server 350 to a second receiving interface (not shown in FIG. 4) within the LAC 360 where the LAC 360 serves to create secure channels to private areas of the network for those users who are authorized to use such sites and, an assessor within the LAC 360 makes a determination as to whether or not the virtual circuit profile for DSLAM port has a domain configuration override attribute associated with it. A calculator determines whether the service associated with the virtual circuit matches the service associated with the domain configuration override attribute. If a domain configuration override attribute does not exist in the profile, a connection is opened through the LNS 400 of the requested private domain. If a domain configuration override attribute does exist in the virtual circuit profile for the specified DSLAM port, or if the PPP authentication packet does not include a domain name, an exclusive tunnel is established with the LNS 400 associated with domain indicated by the virtual circuit profile corresponding to the DSLAM port.

In accordance with one embodiment of the present invention, the LAC service and the LNS may be implemented using a Cisco 6400 Universal Access Concentrator, available from Cisco Systems, Inc. of San Jose, Calif.

Figure 5:
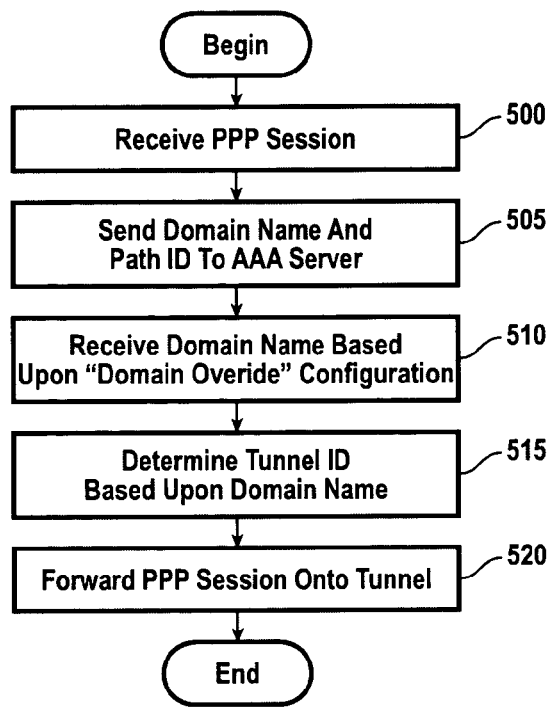
FIG. 5 is a flow diagram that illustrates a method for static configuration of tunnel-based network connections in accordance with one embodiment of the present invention.
Figure 6:
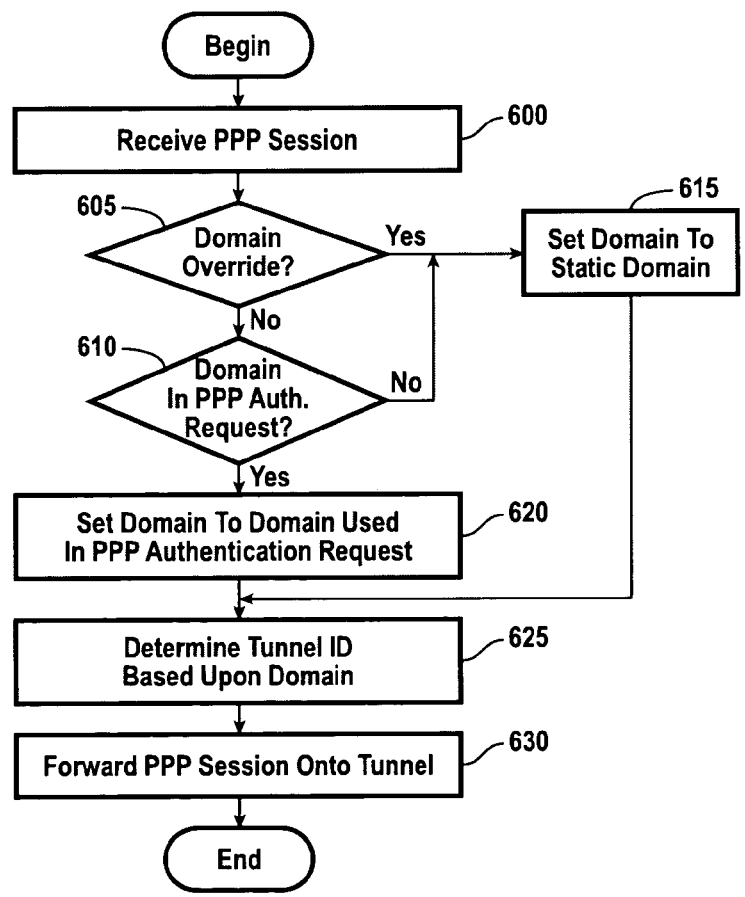
FIG. 6 is a flow diagram that illustrates a method for static configuration of tunnel-based network connections in accordance with one embodiment of the present invention.

FIGS. 5 and 6 are flow diagrams that illustrate methods by which a LAC or similar device determines information needed to associate a particular virtual circuit with a tunnel ID.

Turning now to FIG. 5, a flow diagram that illustrates a method for static configuration of tunnel-based network connections in accordance with one embodiment of the present invention is presented. According to this embodiment of the present invention, an AAA server maintains a table of domain names indexed by virtual circuit identifiers, and a LAC maintains a table of tunnel IDs indexed by domain names. At 500, a PPP session is received by a LAC or similar device. At 505, an identifier that uniquely describes the virtual circuit used to receive the PPP session (such as a VPI/VCI identifier) is sent to the AAA server. At 510, a domain name that is associated with the unique identifier is received from the AAA server. At 515, a tunnel ID is determined based upon the domain name. The LAC performs a table lookup to obtain the tunnel ID associated with the domain name. At 520, if a tunnel ID has been determined, a tunneling session with the LNS associated with the tunnel ID is established and the PPP session is forwarded to the LNS.

According to another embodiment of the present invention, the information regarding the mapping between virtual circuit ID and tunnel ID is maintained by the LAC or similar device. FIG. 6 is a flow diagram that illustrates a method for static configuration of tunnel-based network connections in accordance with one embodiment of the present invention is presented. At 600, a PPP session is received by a LAC or similar device. At 605, a determination is made regarding whether a domain configuration override attribute exists in a virtual circuit profile associated with the DSLAM port used to receive the PPP session. If a domain override attribute exists or if the PPP authentication packet does not include a domain name (610), at 615, the domain is set to the domain indicated in the virtual circuit profile. If a domain override attribute does not exist, the domain is set to the domain used in the PPP authentication packet at 620. The tunnel ID is determined based upon the domain at 625, and the PPP session is forwarded to the LNS at 630.

Figure 7:
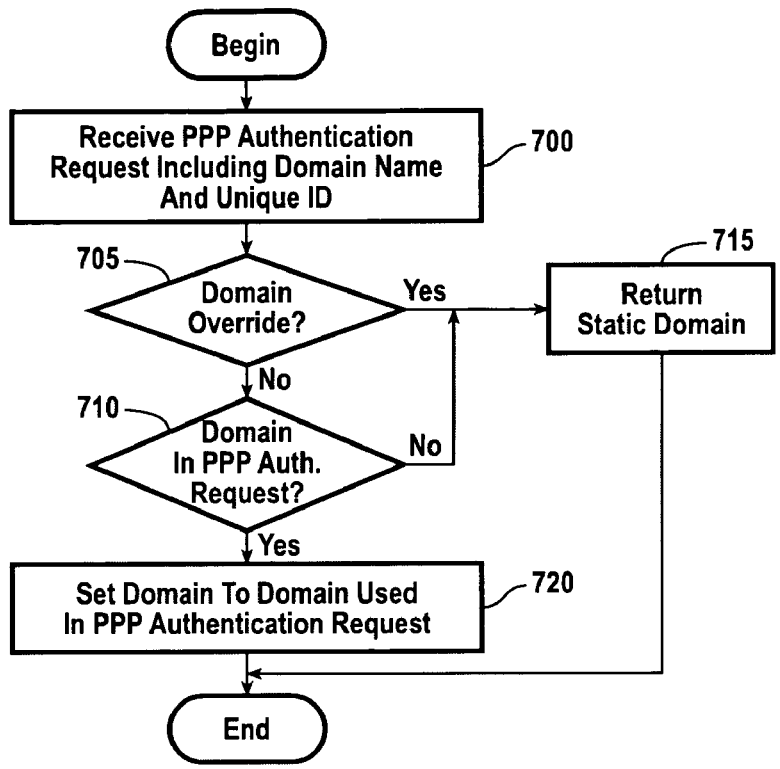
FIG. 7 is a flow diagram that illustrates a method for determining the domain name associated with virtual circuit in accordance with one embodiment of the present invention.
Figure 8:
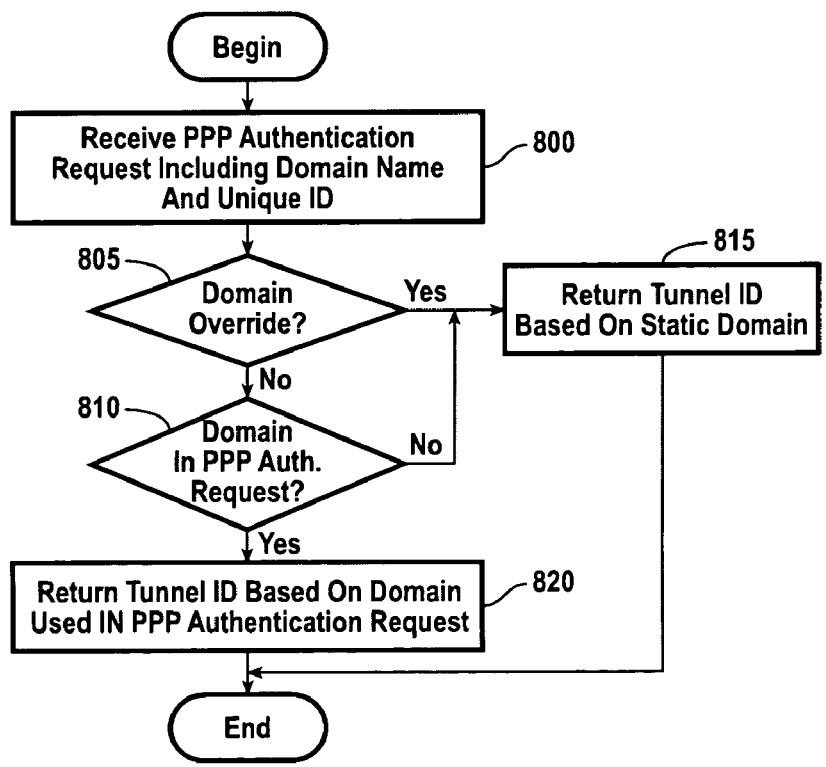
FIG. 8 is a flow diagram that illustrates a method for determining the tunnel ID associated with a virtual circuit in accordance with one embodiment of the present invention.

FIGS. 7 and 8 are flow diagrams that illustrate methods by which an AAA server or similar device determines information needed to associate a particular virtual circuit with a tunnel ID.

Turning now to FIG. 7, a flow diagram that illustrates a method for determining the domain name associated with a virtual circuit in accordance with one embodiment of the present invention is presented. At 700, a PPP authentication request including a virtual channel ID is received by an AAA server or similar device. At 705, a determination is made regarding whether a domain configuration override attribute exists in a virtual circuit profile associated with the DSLAM port used to receive the PPP session. If a domain configuration override attribute exists or if the PPP authentication packet does not include a domain name (710), at 715, the domain associated with the virtual channel is returned. If a domain configuration override attribute does not exist; at 720, the PPP domain used in the PPP authentication request is returned.

Turning now to FIG. 8, a flow diagram that illustrates a method for determining the tunnel ID associated with a virtual circuit in accordance with one embodiment of the present invention is presented. At 800, a PPP session including a virtual channel ID is received. At 805, a determination is made regarding whether a domain configuration override attribute exists in a virtual circuit profile associated with the DSLAM port used to receive the PPP session. If a domain configuration override attribute exists, at 815, the tunnel ID associated with the virtual channel is returned. If a domain configuration override attribute does not exist, at 820, the PPP domain used in the PPP authentication request is returned.

Figure 9A:
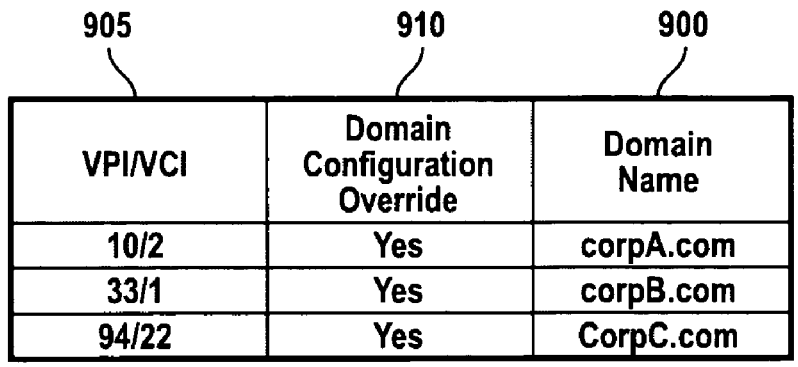
FIG. 9A is a virtual circuit profile table that illustrates tunnel configuration information that may be stored in accordance with one embodiment of the present invention.
Figure 9B:
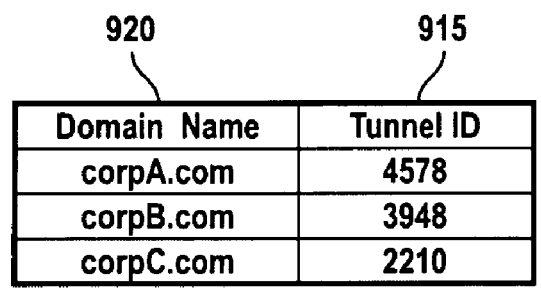
FIG. 9B is a table that includes a list of tunnel IDs and associated virtual circuit identifiers in accordance with one embodiment of the present invention.
Figure 9C:
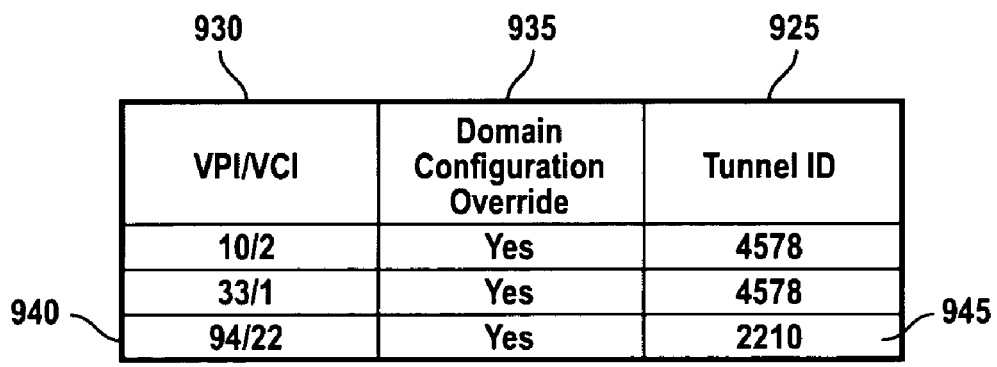
FIG. 9C is a virtual circuit profile table that illustrates tunnel configuration information that may be stored in accordance with one embodiment of the present invention.

FIGS. 9A-9C are tables that illustrate tunnel configuration information that may be stored in a LAC, an AAA server, or other similar devices in accordance with embodiments of the present invention. FIG. 9A is a virtual circuit profile table that contains a list of domain names 900 indexed by virtual circuit IDs 905. A domain configuration override attribute 910 determines whether a subscriber is limited to establishing a tunnel with a particular domain.

FIG. 9B is a table that includes a list of tunnel IDs 915 indexed by domain names 920. Table 9B may be used in conjunction with table 9A to obtain a tunnel ID 915 associated with a virtual circuit ID 905.

FIG. 9C is a virtual circuit profile table that contains a list of tunnel IDs 925 indexed by virtual circuit IDs 930. A domain configuration override attribute 935 determines whether a subscriber is limited to establishing a tunnel with a particular domain. In the example, a port having a virtual circuit ID of 94/22 (940) may use tunnel ID 2210 (945) exclusively.

The domain configuration override attribute is requested by the domain owner to be placed in virtual circuit profiles. It allows the service provider the capability to ensure that a PPP session originating from a DSLAM port allocated to a particular domain can connect with only that particular domain, regardless of what domain name is entered in the PPP authentication packet. This provides added security to the owner of the private domain by lessening the likelihood of an unauthorized access to the home gateway of a corporate intranet. The service provider would have the control over which ports are allocated to which domains. The service provider would also have control over which ports have the domain configuration attribute in their virtual circuit profile and are, thus, limited to one domain and which virtual circuit profiles do not contain the domain configuration override attribute and are, thus, free to connect to more than one domain.

Although embodiments of the present invention is have been described with respect to virtual circuits in an ATM networking environment, it should be understood that a virtual circuit assigned to a subscriber in system may be defined in any suitable networking environment using any suitable communication technologies and protocols, without deviating from the scope of the present invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for determining the domain name associated with virtual circuit, the method comprising:
   receiving, at an Authentication, Authorization, and Accounting (AAA) server, a Point-to-Point Protocol (PPP) authentication request comprising a unique identifier, the unique identifier comprising a virtual channel ID;
   determining whether a domain configuration override attribute exists in a virtual circuit profile associated with a DSLAM port used to receive the PPP authentication request;
   if the domain configuration override attribute exists in the virtual circuit profile or if the PPP authentication request does not comprise a domain name, returning a domain name associated with the unique identifier; and
   if the domain configuration override attribute does not exist in the virtual circuit profile, returning a PPP domain name used in the PPP authentication request.

2. The method of claim 1 wherein the domain configuration override attribute is for use in determining whether a network service subscriber is limited to establishing a tunnel with a particular domain.

3. A method for determining the tunnel ID associated with virtual circuit, the method comprising:
   receiving, at an Authentication, Authorization, and Accounting (AAA) server, a Point-to-Point Protocol (PPP) authentication request comprising a unique identifier, the unique identifier comprising a virtual channel ID;
   determining whether a domain configuration override attribute exists in a virtual circuit profile associated with a DSLAM port used to receive the PPP authentication request;
   if the domain configuration override attribute exists in the virtual circuit profile or if the PPP authentication request does not comprise a domain name, returning a tunnel ID associated with the unique identifier; and
   if the domain configuration override attribute does not exist in the virtual circuit profile, returning a PPP domain name used in the PPP authentication request.

4. The method of claim 3 wherein the domain configuration override attribute is for use in determining whether a network service subscriber is limited to establishing a tunnel with a particular domain.

5. An apparatus for determining the domain name associated with virtual circuit, the apparatus comprising:
   means for receiving a Point-to-Point Protocol (PPP) authentication request comprising a unique identifier, the unique identifier comprising a virtual channel ID;
   means for determining whether a domain configuration override attribute exists in a virtual circuit profile associated with a DSLAM port used to receive the PPP authentication request;
   means for, if the domain configuration override attribute exists in the virtual circuit profile or if the PPP authentication request does not comprise a domain name, returning a domain name associated with the unique identifier; and
   means for, if the domain configuration override attribute does not exist in the virtual circuit profile, returning a PPP domain name used in the PPP authentication request.

6. An apparatus for determining the tunnel ID associated with virtual circuit, the apparatus comprising:
   means for receiving, at an Authentication, Authorization, and Accounting (AAA) server, a Point-to-Point Protocol (PPP) authentication request comprising a unique identifier, the unique identifier comprising a virtual channel ID;
   means for determining whether a domain configuration override attribute exists in a virtual circuit profile associated with a DSLAM port used to receive the PPP authentication request;
   means for, if the domain configuration override attribute exists in the aid virtual circuit profile or if the PPP authentication request does not comprise a domain name, returning a tunnel ID associated with the unique identifier; and
   means for, if the domain configuration override attribute does not exist in the virtual circuit profile, returning a PPP domain name used in the PPP authentication request.

7. An Authentication, Authorization, and Accounting (AAA) server for determining the domain name associated with virtual circuit, the AAA server comprising:
   a memory; and
   a processor adapted to:
      receive a Point-to-Point Protocol (PPP) authentication request comprising a unique identifier, the unique identifier comprising a virtual channel ID;
      determine whether a domain configuration override attribute exists in a virtual circuit profile associated with a DSLAM port used to receive the PPP authentication request;
      if the domain configuration override attribute exists in the virtual circuit profile or if the PPP authentication request does not comprise a domain name, return a domain name associated with the unique identifier; and if the domain configuration override attribute does not exist in the virtual circuit profile, return a PPP domain name used in the PPP authentication request.

8. An Authentication, Authorization, and Accounting (AAA) server for determining the tunnel ID associated with virtual circuit, the AAA server comprising:

a memory; and a processor adapted to:

receive a Point-to-Point Protocol (PPP) authentication request comprising a unique identifier, the unique identifier comprising a virtual channel ID;

determine whether a domain configuration override attribute exists in a virtual circuit profile associated with a DSLAM port used to receive the PPP authentication request;

if the domain configuration override attribute exists in the virtual circuit profile or if the PPP authentication request does not comprise a domain name, return a tunnel ID associated with the unique identifier; and if the domain configuration override attribute does not exist in the virtual circuit profile, return a PPP domain name used in the PPP authentication request.

* * * * *